United States Patent
Valo et al.

(10) Patent No.: US 7,385,962 B1
(45) Date of Patent: Jun. 10, 2008

(54) METHOD AND APPARATUS FOR DYNAMIC RADIO RESOURCE CONTROLLING

(75) Inventors: Marko Valo, Tampere (FI); Juha Räsänen, Espoo (FI)

(73) Assignee: Spyder Navigations, L.L.C., Wilmington, DE (US)

( * ) Notice: Subject to any disclaimer, the term of this patent is extended or adjusted under 35 U.S.C. 154(b) by 1332 days.

(21) Appl. No.: 09/397,300

(22) Filed: Sep. 15, 1999

(30) Foreign Application Priority Data

Sep. 16, 1998  (FI)  ......................................  982002
Dec. 7, 1998  (FI)  ......................................  982643

(51) Int. Cl.
  *H04B 7/212*  (2006.01)
(52) U.S. Cl. ................................. 370/347; 379/215.01
(58) Field of Classification Search ................ 370/328, 370/329, 330, 336, 345, 348, 349, 350, 347, 370/527, 529; 455/406, 414
  See application file for complete search history.

(56) References Cited

U.S. PATENT DOCUMENTS

| | | | | |
|---|---|---|---|---|
| 4,517,669 A | * | 5/1985 | Freeburg et al. | 370/329 |
| 5,204,855 A | * | 4/1993 | Bebee et al. | 370/436 |
| 5,276,703 A | * | 1/1994 | Budin et al. | 370/347 |
| 5,359,593 A | | 10/1994 | Derby et al. | 370/17 |
| 5,583,869 A | | 12/1996 | Grube et al. | 370/347 |
| 5,673,266 A | * | 9/1997 | Li | 370/465 |
| 5,793,744 A | | 8/1998 | Kanerva et al. | 370/209 |
| 5,859,843 A | | 1/1999 | Honkasalo et al. | 370/342 |
| 5,966,374 A | * | 10/1999 | Rasanen | 370/337 |
| 5,974,032 A | * | 10/1999 | Snowden et al. | 370/316 |
| 6,044,067 A | * | 3/2000 | Suzuki | 370/252 |
| 6,052,385 A | * | 4/2000 | Kanerva et al. | 370/468 |
| 6,130,884 A | * | 10/2000 | Sato | 370/335 |
| 6,167,079 A | * | 12/2000 | Kinnunen et al. | 370/232 |

FOREIGN PATENT DOCUMENTS

WO   WO 96/36146   11/1996

* cited by examiner

*Primary Examiner*—Duc M. Nguyen
*Assistant Examiner*—Justin Lee (57) ABSTRACT

A method and a mobile terminal for communicating with a mobile network element (IWF) comprising communicating with a mobile network element (IWF) using a bearer that is modifiable by a negotiation between the mobile terminal (MS) and the mobile network element (IWF). The data is divided into data units (60) that comprise at least one user data element (61) and at least one status data element (62), said status data element (62) optionally comprising a status indication (63) from the mobile network element (IWF) to the mobile terminal (MS). A need for bearer modification is detected from received status indications (63) in at least two consecutive data units; and a negotiation for bearer modification is initiated, as a response to the detected need for bearer modification.

18 Claims, 5 Drawing Sheets

|   | 8 | 7 | 6 | 5 | 4 | 3 | 2 | 1 |
|---|---|---|---|---|---|---|---|---|
| 0 | SA | SB | x | 0 | 0 | 0 | 1 | 1 |
| 1 | 1 | 1 | 0 | 0 | 0 | 1 | 1 | 1 |
| 2 | 1 | 1 | 0 | 1 | 0 | 0 | 1 | 1 |
| 3 | 1 | 1 | 0 | 0 | 1 | 1 | 0 | 1 |
| 4 | SA | SB | x | 1 | 1 | 1 | 1 | 1 |
| ... | | | | | | | | |
| n-1 | | | | | | | | |

METHOD AND APPARATUS FOR DYNAMIC RADIO RESOURCE CONTROLLING

FIELD OF THE INVENTION

The present invention relates to a method for communicating with a mobile network element and a mobile terminal implementing the method. The mobile terminal comprises transmission means for communicating with a mobile network element using a bearer that is modifiable by a negotiation between the mobile terminal and the mobile network element, said data being divided into data units that comprise at least one user data element and at least one status data element, said status data element optionally comprising a status indication from the mobile network element to the mobile terminal.

BACKGROUND OF THE INVENTION

Many existing digital wireless or mobile telephone networks make use of time division multiple access (TDMA) to share out radio resources between a number of mobile stations and between a number of channels. For example, in the European Telecommunications Standards Institute (ETSI) GSM standard, a given frequency band is divided in the time domain into a succession of frames, known as TDMA (Time Division Multiplexed Access) frames. The length of a TDMA frame is 4.615 ms. Each TDMA frame is in turn divided into eight consecutive slots of equal duration. In the conventional circuit switched transmission mode, when a call is initiated, a full rate bidirectional traffic channel (TCH/F) is defined for that call by reserving two time slots (1 to 8), in each of a succession of TDMA frames, for the duration of the call. One of these slots provides the downlink from the base station (BS) to the mobile station (MS) whilst the other provides the uplink. The circuit switched transmission mode in GSM provides for a data transmission rate of 9.6 kbps. However, due to the demand for higher transmission rates, a set of GSM enhancements known as GSM Phase 2+ have been specified by ETSI. One of the main features of GSM Phase 2+ is known as High Speed Circuit Switched Data (HSCSD—specified in GSM 02.34 and GSM 03.34) which achieves an increased data transmission rate by using more than one TCH/F for a single connection (i.e. effectively reserving two or more consecutive time slots in each TDMA frame).

In GSM HSCSD non-transparent connection mode the user can (if the MS supports this feature) request service level up- or downgrading, i.e. request more or less time slots to be allocated for a connection. Provided that the feature is requested in the set-up of a call, service level up- and downgrading is possible during an ongoing call. For example, when setting up a connection to an Internet Service Provider (ISP), the login and authorisation procedures do not require a lot of transmission capacity and could therefore be managed with one time slot connection. When the connection is established and a large file or a www-page (World Wide Web) containing graphics is being downloaded, more transmission capacity is needed. When the file or the www-page are downloaded and the user is reading the information, the need for capacity is not that big anymore, and a small number of time slots are needed.

The advantage of using a correct amount of capacity, i.e. correct number of time slots at each time draws from the fact that the user pays for the connection depending on the amount of time slots used. The less capacity is used, i.e. the less time slots are wasted, and the less the user has to pay.

In addition, this approach is advantageous also with respect to the network, since the same resources can be used to facilitate services for a remarkably larger number of users.

However, until now the initiative of radio resource modification (e.g. capacity) is left to the user, which means that in order to be able to properly utilise said radio resource modification, the user should be able to perform relatively complicated call control procedures. On the other hand, the protocols between a mobile station and network entities have been quite definitely specified in the standards, and any new solutions for easier assessment of radio resource modification that require changes to existing standards and/or to existing mobile network elements are not very satisfactory.

Furthermore, to facilitate such up- or downgrading of service level, also the application running in the MS must be adapted to support this feature. This means that for example, a www-browser or an email application in the MS must be adapted to recognise that the connection used is a GSM connection employing multiple time slots, and that service level up- and downgrading is supported by the mobile. So far no such applications exist, and even if some such applications were created, mobile subscribers would always be limited to those few adapted applications available.

SUMMARY OF THE INVENTION

Now, a method and a device have been invented, with which the effect of these problems can be considerably reduced.

According to the first aspect of the invention the mobile terminal comprises detecting means for detecting a need for bearer modification from received status indications in at least two consecutive data units; and control means for initiating a negotiation for bearer modification, as a response to the detected need for bearer modification.

In the solution according to the invention, the mobile terminal is arranged to analyse the received data flow, and using the existing information therein to decide whether a correct radio resource is used for the transmission or not. If the radio resource is insufficient, the mobile terminal will initiate negotiations for radio resource upgrading. If the radio resource is excessive, the mobile terminal will initiate negotiations for radio resource downgrading.

Consequently, radio resource modifications can be implemented automatically without the user or the data processing entity connected to the MS necessarily being involved with the control of the properties of the radio resource. Accordingly, the present invention enables easy utilisation of the dynamic nature of the data link.

According to a second aspect of the invention a method for communicating with a mobile network element is presented. The method comprises communicating with a mobile network element using a bearer that is modifable by a negotiation between the mobile terminal and the mobile network element. The data is divided into data units that comprise at least one user data element and at least one status data element, said status data element optionally comprising a status indication from the mobile network element to the mobile terminal. The method is characterized by detecting a need for bearer modification from received status indications in at least two consecutive data units; and initiating a negotiation for bearer modification, as a response to the detected need for bearer modification.

BRIEF DESCRIPTION OF THE DRAWINGS

For a better understanding of the invention and in order to show how the same may be carried into effect reference will now be made, by way of example, to the accompanying drawings, in which.

DETAILED DESCRIPTION

The invention will, by way of an example, be described in connection with GSM (Global System for Mobile Telecommunications) system using the terms and elements traditionally appearing in this context. Further embodiments in functionally equivalent mobile communication system environments are naturally possible. Among the preferred systems are, for example, GSM derivatives, like DCS (Digital Cellular System for 1800 MHz) and PCS (Personal Communications Service for 1900 MHz).

Figures 1, 2:
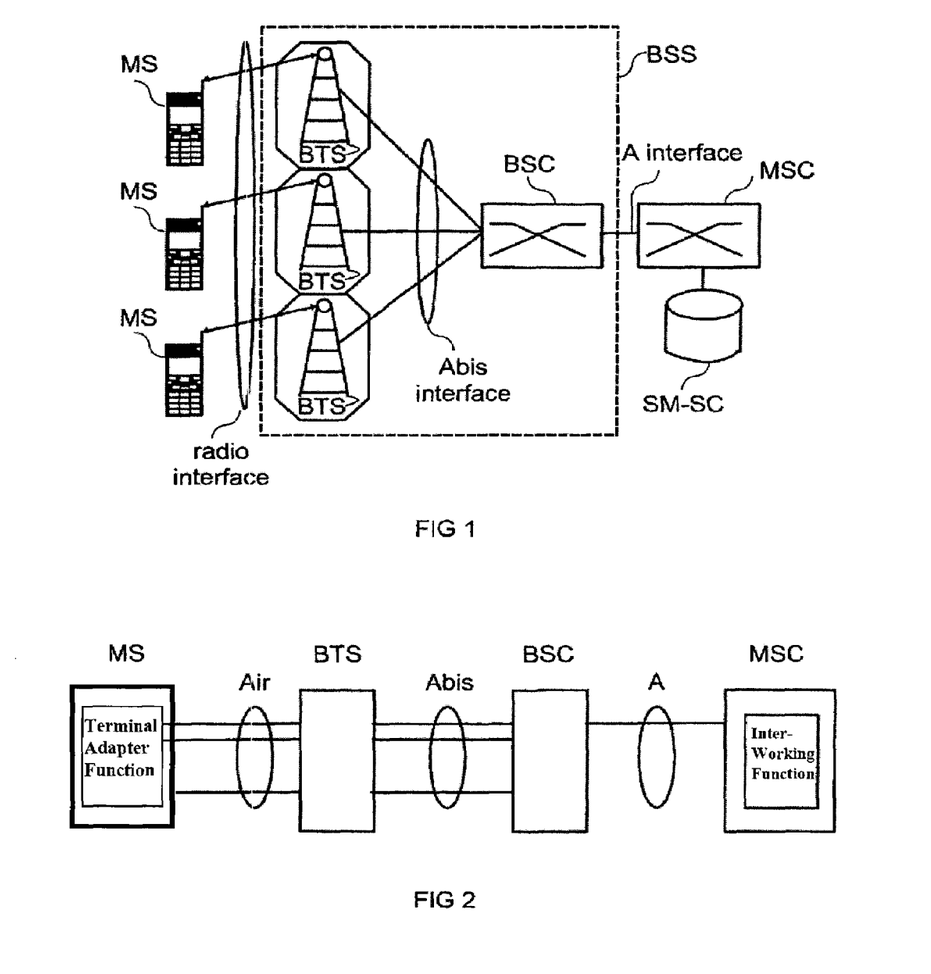
FIG. 1 illustrates the basic elements of the GSM system (state of the art)
FIG. 2 illustrates a generalised implementation of HSCSD services in the GSM network (state of the art)

FIG. 1 illustrates the basic elements of the GSM system. Mobile stations MS are in connection with base stations BTS using radio communication. The base stations BTS are further, through a so-called Abis interface, connected to a base station controller BSC, which controls and manages several base stations. The entity formed by several base stations BTS and a single base station controller BSC controlling them are called a base station sub-system BSS. Particularly, the base station controller BSC manages radio-communication channels, as well as handovers. On the other hand, the base station controller BSC is, through the so-called A interface, in connection with a mobile services switching centre (MSC), which co-ordinates the establishment of connections to and from mobile stations. Through the mobile services switching centre MSC, a connection can further be established to a subscriber not operating under the mobile communication network.

A set of GSM enhancements specified by European Telecommunications Standards Institute (ETSI) is called ETSI Phase 2+. One of the main work items in phase 2+ is High Speed Circuit Switched Data (HSCSD). HSCSD is an enhancement of the current circuit switched GSM data services to cover higher user rates than 9.6 kbps. The architecture of the HSCSD service is based on the physical layer of the current data services. The increased data rate is achieved by using a combination of more than one full traffic channel (TCH/F) for a single connection.

In the transparent data transmission mode the maximum HSCSD data rate is 64 kpbs using bit transparent protocols. In non-transparent mode the maximum data rate is 38.4 kpbs achieved by using a combination of four TCH/F9.6 channels. After the standardisation of the 14.4 kbps channel coding is completed, the maximum non-transparent data rate is increased to 57.6 kpbs. The effective user data rate of the non-transparent HSCSD data service may be further increased by using GSM data compression that is based on V.42 bis algorithm. This compression algorithm increase the effective user data rate to between two and four times the physical user data rate.

Non-transparent mode of HSCSD is realised by modifying the RLP (Radio Link Protocol) and L2R (Layer 2 Relaying) functions to support multiple parallel traffic channels (TCH/F) instead of only one TCH/F, and the RLP frame numbering is increased to accommodate the enlarged data transmission rate, as specified by the ETSI and generally known to a person skilled in the art. FIG. 2 illustrates a generalised implementation of HSCSD services in the GSM network. In addition to the network elements described in connection of FIG. 1, a new functionality IWF (Inter-Working Function) is introduced in the network side and TAF (Terminal Adapter Function) in a mobile station. The new elements provide the functions of combining and splitting the data into separate data streams, which will then be carried via n channels at the radio interface. Once split, the data streams shall be carried by the n full rate traffic channels, called HSCSD channels, as if they were independent of each other, for the purpose of data relay and radio interface error control, until to the point in the network where they are combined.

To couple the Terminal Adapter Function with Interworking control procedures, a group of GSM Bearer Capability Information Elements (BCIE) need to be defined during the call set-up procedure. The BCIE comprise a parameter User Initiated Modification Indication (UIMI), which is relevant between the MS and IWF. The value of UIMI indicates whether the user would like to be able to modify the value of maximum number of traffic channels during a connection, and in positive case also the maximum number of time slots available for upgrading the connection.

Among parameters negotiated in the call set-up procedure are also the Fixed Network User Rate (FNUR), which defines the user rate between the IWF and the fixed network, and the Wanted Air Interface User Rate (WAIUR) defining the air interface user rate between the MS and IWF.

Figure 3:
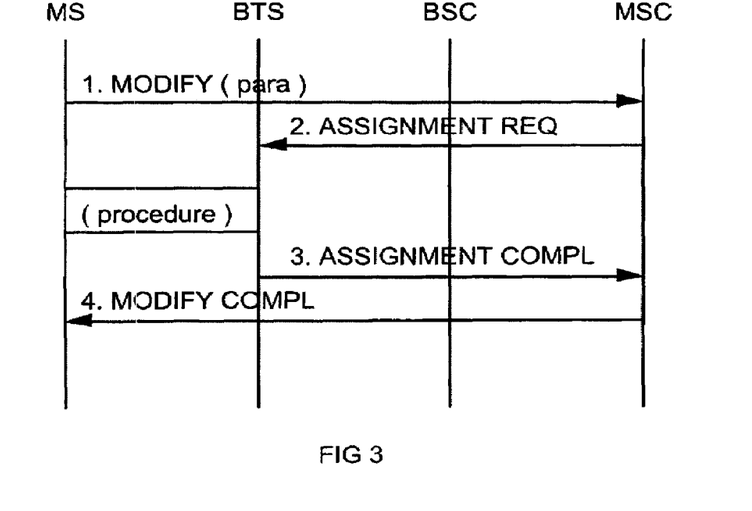
FIG. 3 illustrates an example of the signalling in GSM HSCSD, associated with the user initiated service level up- and downgrading procedure (state of the art)

If the parameter UIMI has been given a non-zero value, during a HSCSD call the user may request the network to change the current maximum number of traffic channels and air interface user rate parameters. FIG. 3 illustrates an example of the signalling in GSM HSCSD, associated with the user initiated service level up- and downgrading procedure. The user will initiate the procedure with a signal 3.1 comprising the new parameters para defining the radio resource wished for. If the network allows the modification, the resulting new parameters are forwarded to the BSC (signal 3.2) and the radio interface resources may be adjusted accordingly. The resource upgrading and downgrading are done separately from the change in HSCSD parameters. However, if a contradiction between the new parameters and the used air interface resources exists, the resource downgrading may be needed before the network acknowledges the new parameters. When the procedure is finished, the BSC will acknowledge it to the MSC (signal 3.3) and the MSC will indicate the completion of the modification to the MS (signal 3.4).

In the system according to the embodiment of the invention, the mobile station monitors the data flow transferred over the air interface, and based on the monitoring results intelligently controls e.g. the number of the time slots used for the connection. In the following, some embodiments of the invention are discussed. The radio resource used for a connection is hereafter referred to as a bearer.

Figure 4:
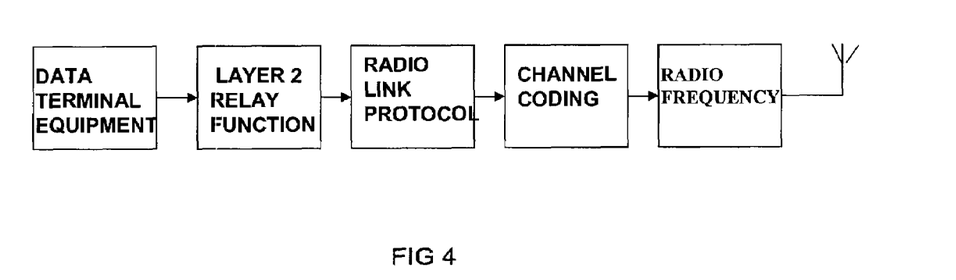
FIG. 4 illustrates the functional elements of the data transfer process in GSM (state of the art)
Figure 5:
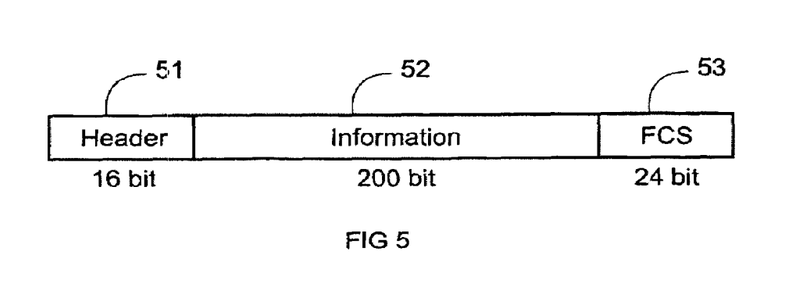
FIG. 5 illustrates the structure of a RLP frame.

According to the invention the data already available in data units is used by the MS to derive the decision whether bearer modification is necessary. To demonstrate the structural division of transceived information, data transfer process in a GSM system supporting HSCSD service is studied. FIG. 4 illustrates the functional elements of the data transfer process in GSM. Data from the Data Terminal Equipment DTE is processed by Layer 2. Relay function L2R, which provides for the reliable transportation of known, i.e. non transparent, user protocols across the radio interface of a GSM PLMN. The L2R uses the services provided by the Radio Link Protocol (RLP) to transport the non-transparent protocol information between the MS and the network. In FIG. 5 an example of a RLP frame 50 is shown. The frame typically comprises a header 51, an information field 52 and a frame check sequence 53. The information of L2R data units is carried in the information field 52 of the frame.

The decision on whether a correct radio resource is used could also be made in the IWF and be indicated to the MS in the header 51 of the RLP frame. Anyhow, this seems to be an unnecessary association between a link layer protocol and a non-link-layer function, and as conceivably bringing about some changes to the protocol, would not be very satisfactory.

Figure 6:
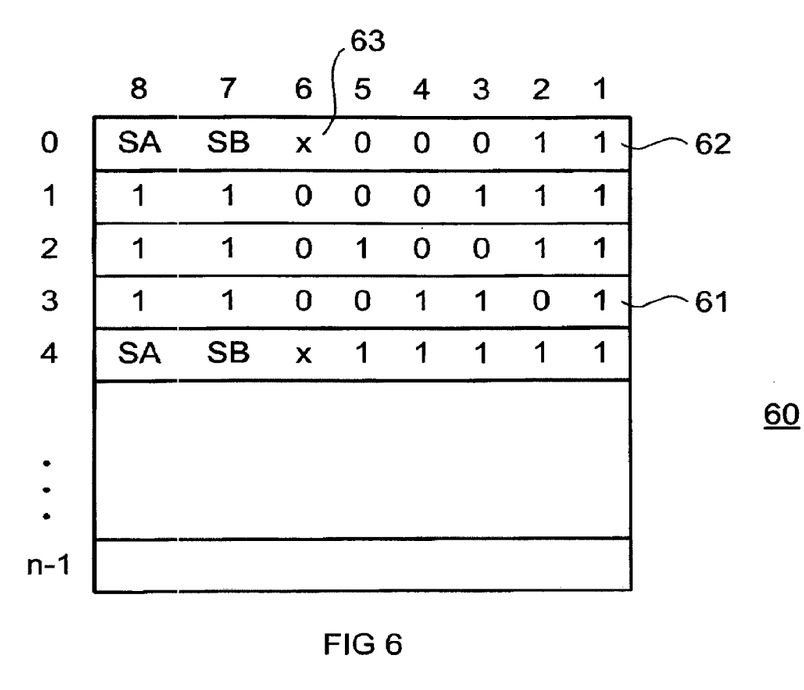
FIG. 6 illustrates an example of a L2R Packet Data Unit (PDU)

In FIG. 6 as an example of a data unit, a structure of a L2R Packet Data Unit (PDU) is illustrated. It comprises consecutive octets that are data octets 61 carrying user data and status octets 62 carrying general information on the contents of the PDU and/or the status of the connection.

The L2R and RLP entities have buffers which may become full to a predetermined threshold for a number of reasons, e.g. severe radio fading, failure or slowness of DTE to react to end-to-end flow control, or certain RNR conditions. When this predetermined threshold is reached, a flow control active condition is sent to the associated DTE, which is then prevented from sending any data. Subsequently, the flow control inactive condition is sent to the associated DTE when the L2R or RLP entities have indicated that there is sufficient free capacity in their buffers for data flow from the associated DTE to proceed. A status octet 62 of a L2R PDU comprises a flow control indication bit 63 indicating whether the flow control in the DTE in the opposite end is active or inactive. A status octet may also comprise a break indication bit indicating that the rest of the PDU is empty, i.e. the PDU is not full of user data.

In the solution according to the invention, the user has an opportunity to enable or disable the use of user initiated bearer modification. When the modification is enabled, the mobile station according to the invention starts monitoring the contents of the consecutively received data units, here the L2R PDUs. In the first embodiment of the invention, the MS will especially monitor consecutively received flow control indication bits. Whenever it seems that the flow control in the IWU end is active for a long period, the MS deduces that the data rate should be downgraded and initiates a bearer downgrading negotiation. If the flow control is not active or has not been active for some time, the MS will initiate a radio resource upgrading negotiation. The decision, on when the flow control is active or inactive for a long time, i.e. when the bearer modification (upgrading or downgrading) in this case is necessary, can be derived in many ways. Next one of the possible ways is described.

Figure 7:
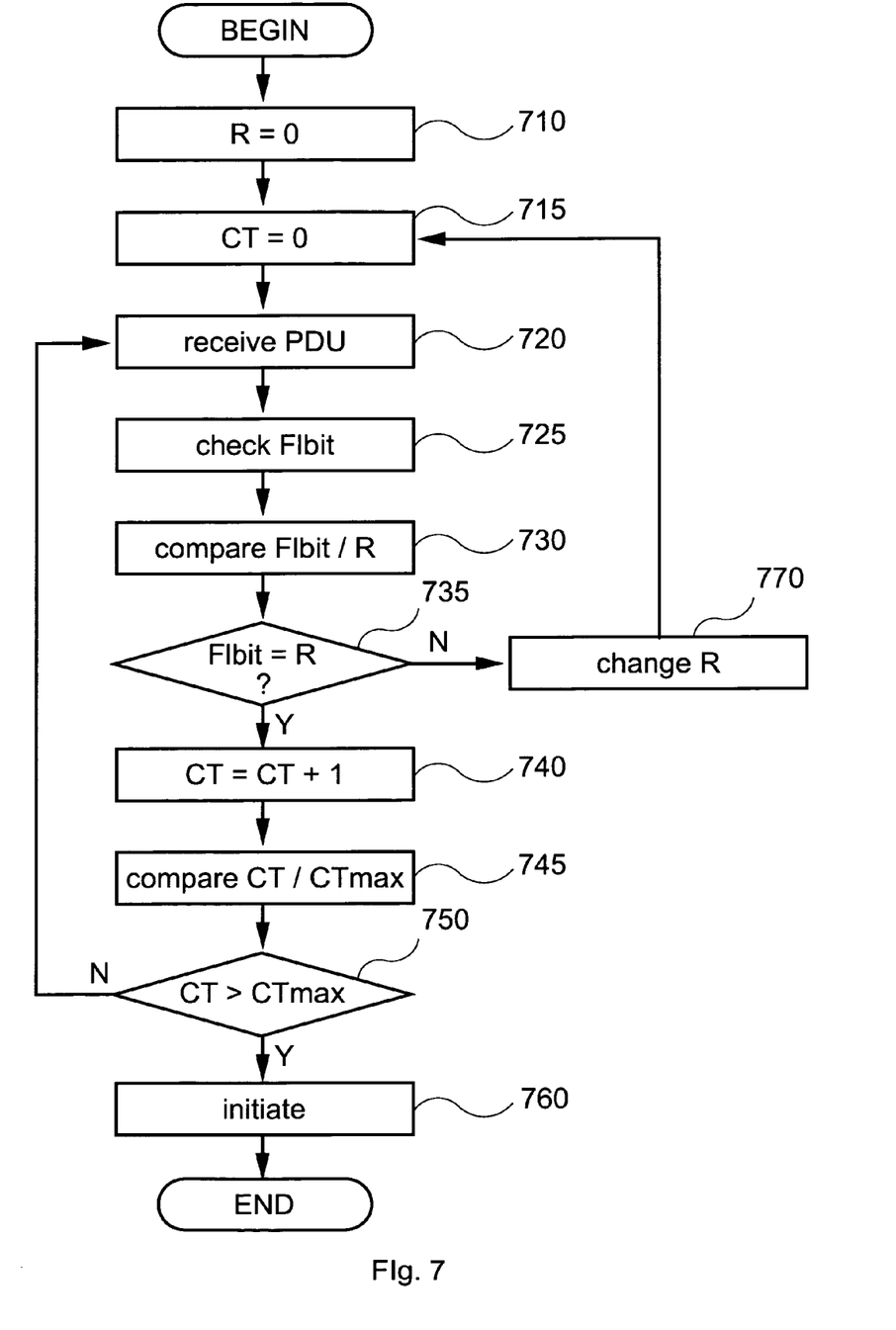
FIG. 7 illustrates the functionality of a MS according to the invention.

The flow chart of FIG. 7 illustrates the functionality of a MS according to the invention from the beginning of a set-up of a call or from the acknowledged bearer modification. In step 710 the reference value R equalling to the value of the received status bit FIbit (Flow control Indication bit) that indicates the activity or inactivity of the flow control in the IWU, is initialised. In step 715 the counter CT, which is used for storing the number of consecutive FIbits having the same value, is initialised. After this the first PDU is received (step 720), and the value of FIbit is checked (step 725). The received value FIbit is compared with the reference value R (steps 730, 735), and if they are not the same, the reference value R will be changed (step 770). If the FIbit is the same as the reference value R, the counter CT is incremented (steps 740). The derived counter value CT is compared (steps 745, 750) with the threshold value CTmax that indicates the maximum number of consecutive flow control indication bits that are detected before the initiation of bearer modification. If the counter value is less than or equal to CTmax, the process will continue from step 720 where the next PDU is received. If the counter value CT is greater than CTmax, the MS will initiate a negotiation for a bearer modification, as described earlier (step 760).

The embodiment of FIG. 7 is an example of a solution according to the invention. It applies well for controlling the radio transmission in the uplink direction. Anyhow, as mentioned earlier, the interval of consecutive indication of flow control before initiation of bearer modification can be implemented in many ways. For example, a timer that is initialised each time the value of the flow control indication bit changes can be used. It is also possible to use different threshold values for bearer upgrading and downgrading. For example, bearer upgrading can be initiated after a number of consecutive bits that indicate the Flow control inactive-status, and bearer downgrading can be initiated after a number of consecutive bits that indicate the Flow control active-status.

Figure 8:
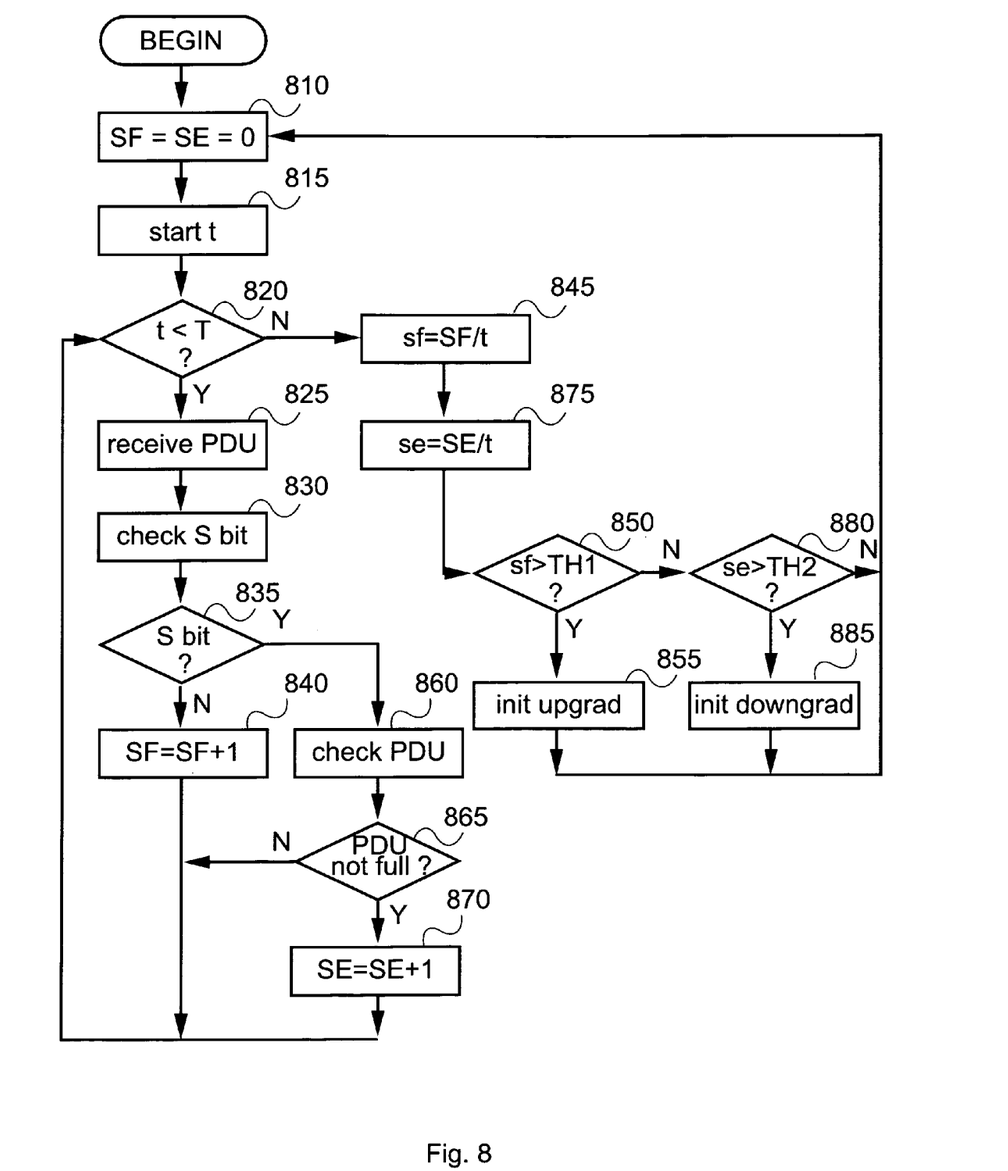
FIG. 8 illustrates an embodiment for controlling the radio transmission in the downlink direction.

The flow chart of FIG. 8 illustrates an embodiment for controlling the radio transmission in the downlink direction. The PDUs comprise information indicating whether the PDU is full or not. By monitoring such information, it is possible to derive an estimate on the effective transmitted user data rate. If the effective user data rate is substantially less than the full capacity of the used channels, the MS will initiate bearer downgrading. If, on the other hand, the effective user data rate corresponds to the full capacity of the used channels, the MS will try data rate upgrading. The effective user data rate can be derived in several ways, but in the following an embodiment using two simple counters and a timer is described.

The RLP-header of a PDU comprises a S-bit that indicates whether the PDU comprises a status octet or not. Status octets are inserted in the character stream whenever a status change needs to be transmitted. If the PDU is full of data, it does not comprise the status octet. In the embodiment the effective user data rate is derived in predefined intervals T. This means that a timer t is running for a period of T at a time and after the elapse of the time limit T, the estimation of effective user data rate is restarted. In step 810 two counters SE and SF are initialised, and in step 815 the timer t is started. In step 820 the count of the timer t is checked, and whenever the time limit T has elapsed, the process will go to step 845. Until the time limit T has elapsed, a next PDU will be received (step 825) and the indication Sbit, indicating whether the PDU comprises a status octet or not, is checked (step 830). If in step 835 the Sbit indicates that the PDU does not comprise a status octet, the counter SF is incremented (step 840). If the Sbit indicates that PDU comprises a status octet, the contents of the PDU has to be checked more thoroughly (step 860). The status octet comprises status bits SA, SB and X, and a 5-bit code which indicates the location of the next status octet or that the remainder of the PDU is empty. If the indication of the remainder of the PDU being empty is found (step 865), the counter SE is incremented (step 870), otherwise no incrementation is done. After step 865=No or after step 870 the process will continue from step 820. Alternatively the step 865=No could go to step 840 (not shown in the Figure).

When at step 820 it is noted that the time limit T has elapsed, it continues at step 845 in which the current value of the counter SF is divided with the reading t of the timer to derive the rate sf at which PDUs that are full of user data are received. Moreover, at step 875 the current value of the counter SE is divided with the reading t of the timer to derive the rate se. Then it is checked if the derived value of sf is greater than a predefined threshold TH1 (step 850), and if so the MS will initiate a bearer upgrading process (step 855). If sf is not greater than a predefined threshold TH1 another comparison is made (at step 880) to see if the derived value of se is greater than a predefined threshold TH2, and if so the MS will initiate a bearer downgrading process. If the threshold TH1 or TH2 is not exceeded, the process will continue from step 810.

Figure 9:
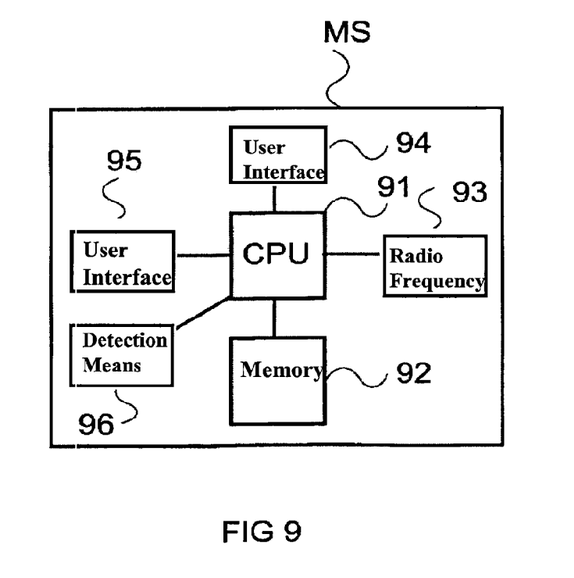
FIG. 9 illustrates functional modules of a mobile terminal according to the invention.

FIG. 9 illustrates functional modules of mobile terminal according to the invention. A Central Processing Unit 91 controls the blocks responsible for the mobile station's different functions: a Memory (MEM) 92, a Radio Frequency block (RF) 93, a User Interface (UI) 94 and an Interface Unit (IU) 95. CPU is typically implemented with one or more functionally inter-working microprocessors. The memory preferably comprises a ROM (Read Only Memory), a RAM (Random Access Memory) and is generally supplemented with memory supplied with the SIM User Identification Module. In accordance with its program, the microprocessor uses the RF block 93 for transmitting and receiving messages on the radio path. Communication with the user is managed with by the UI 94, which typically comprises a loudspeaker, a display and a keyboard. The Interface Unit 95 provides a link to a data processing entity, and it is controlled by the CPU 91. The data processing entity may be an integrated data processor or external data processing equipment. The mobile terminal according to the invention further comprises detection means 96 for monitoring the contents of the received data flow, and based on a certain predefined property in the data flow will detect whether the current bearer is adequate or not. The means may comprise at least one counter that is incremented by consecutive flow control indications, as described in connection with FIG. 6. The means may also comprise one or more counters responsive to the indication of full or partly full PDUs, and a timer, as described in connection with FIG. 9. Other functionally equivalent means are also possible. Though shown as a separate element in FIG. 9, the means may also be integrated within the CPU. By utilising said detection means 96 the mobile terminal is able to automatically control the capacity used for the connection and thereby enhance the effective use of bearer.

The above is a description of the realization of the invention and its embodiments utilizing examples. It is self evident to a person skilled in the art that the invention is not limited to the details of the above presented embodiments and that the invention can be realized also in other embodiments without deviating from the characteristics of the invention. The presented embodiments should be regarded as illustrating but not limiting. Thus the possibilities to realize and use the invention are limited only by the enclosed claims. Thus different embodiments of the invention specified by the claims, also equivalent embodiments, are included in the scope of the invention.

The invention claimed is:

1. A mobile terminal comprising:
   transceiving means for communicating data with a mobile network element using a bearer that is modifiable by a negotiation between the mobile terminal and the mobile network element, said data being divided into data units, wherein each data unit comprises at least one user data element and at least one status data element, said status data element comprising a status indication from the mobile network element to the mobile terminal;
   detecting means for detecting a need for bearer modification from received status indications in at least two consecutive data units; and
   control means for initiating a negotiation for bearer modification, as a response to the detected need for bearer modification.

2. A mobile terminal as claimed in claim 1, wherein the transceiving means is arranged to transceive data units in information fields of frames transmitted over an air interface.

3. A mobile terminal as claimed in claim 2, wherein the frames are transmitted over the air interface in consecutive TDMA data frames, and the bearer modification comprises modification of an amount of time slots in consecutive TDMA frames assigned for the transmission between the mobile terminal and the mobile network element.

4. A mobile terminal as claimed in claim 3, wherein the bearer modification comprises bearer upgrading or bearer downgrading.

5. A mobile terminal as claimed in claim 1, wherein the mobile terminal is a GSM terminal supporting HSCSD service and the mobile network element comprises an Inter-Working Function (IWF) of a Mobile Switching Center (MSC).

6. A mobile terminal as claimed in claim 1, wherein said status indication comprises an indication of flow control when the flow control is active in the mobile network element, and further within said detecting means is responsive to said indication of flow control.

7. A mobile terminal as claimed in claim 6, wherein said detecting means comprises a counter arranged to be incremented as a response to a first data unit that comprises said indication of flow control and is preceded by a second data unit that also comprises said indication of flow control.

8. A mobile terminal as claimed in claim 6, wherein the control means is arranged to initiate a negotiation for bearer downgrading, as a response to a reading of a counter exceeding a predefined threshold.

9. A mobile terminal as claimed in claim 1, wherein the status indication is an ending indication included in the data unit whenever the data unit is not full of data.

10. A mobile terminal as claimed in claim 1, wherein said means for detecting comprises at least one counter arranged to be incremented at least as a response to the data unit comprising an ending indication, and at least one timer.

11. A method for communicating with a mobile network element, comprising:
    communicating data with a mobile network element using a bearer that is modifiable by a negotiation between a mobile terminal and the mobile network element, said data being divided into data units, wherein each data unit comprises at least one user data element and at least one status data element, said status data element comprising a status indication from the mobile network element to the mobile terminal;

detecting a need for bearer modification from received status indications in at feast least two consecutive data units; and initiating a negotiation for bearer modification, as a response to the detected need for bearer modification.

12. A method of communication between a network element and a mobile terminal in a communication network comprising;

exchanging a plurality of data units between the network element and the mobile terminal, wherein at least one data unit includes a status bit indicating that flow control in a data terminal equipment used to transmit the data unit is active or inactive;

analyzing the status bit; and requesting a change in a data rate used to exchange the plurality of data units.

13. The method of communication of claim 12, wherein the plurality of data units are exchanged using a number of time slots, and the data rate is changed by changing the number of time slots.

14. The method of communication of claim 12, wherein the mobile terminal analyzes the status bit and requests the change in the data rate.

15. A communication network comprising;

a mobile terminal;

a network element for exchanging a plurality of data units with the mobile terminal;

circuitry for providing at least one data unit that includes a status bit indicating that flow control in a data terminal equipment used to transmit the data unit is active or inactive; and circuitry for analyzing the status bit and for requesting a change in a data rate used to exchange the plurality of data units.

16. The communication network of claim 15, wherein the mobile terminal and the network element further comprise circuitry for exchanging the plurality of data units using time slots, and wherein the data rate is changed by changing a number of time slots.

17. The communication network of claim 15, wherein the circuitry for providing the at least one data unit that includes the status bit is part of the network element.

18. The communication network of claim 15, wherein the circuitry for analyzing the status bit and for requesting the change in the data rate is part of the mobile terminal.

* * * * *